Feb. 21, 1961       E. L. SVENSSON ET AL       2,972,743
                COMBINED INFRARED-RADAR ANTENNA
                    Filed June 19, 1957
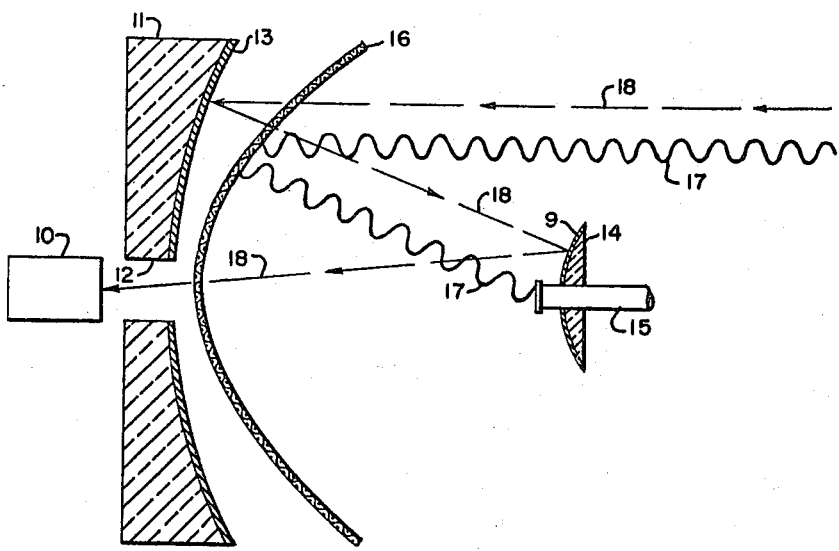
WITNESSES:
Bernard R. Gieguey
Wm. B. Sellers.
INVENTORS
Emil L. Svensson, Jefferson O. Hamby
and Richard F. Higby.
BY Maury I. Hull
ATTORNEY

United States Patent Office 2,972,743
Patented Feb. 21, 1961

2,972,743
COMBINED INFRARED-RADAR ANTENNA

Emil L. Svensson, Glen Burnie, Jefferson O. Hamby, Baltimore, and Richard F. Higby, Severna Park, Md., assignors to Westinghouse Electric Corporation, East Pittsburgh, Pa., a corporation of Pennsylvania Filed June 19, 1957, Ser. No. 666,735

4 Claims. (Cl. 343—838)

This invention relates to radiant energy receiving and transmitting antenna apparatus, and more particularly to antenna apparatus for transmitting or receiving both infrared radiation and radiation of radio frequency at the same time.

Infrared detection systems are being used in military equipment simultaneously with radar detection systems, and particularly infrarer systems are used in conjunction with radar systems in anti-aircraft or anti-missile defense apparatus, and also in conjunction with airborne fire control radar systems.

Heretofore, it has been necessary to have two antennas, one for the infrared radiant energy and the other for the radar energy of radio frequency. Difficulty has been encountered because of weight and size, and in the installation of two antenna systems.

The apparatus of the instant invention overcomes the above-described difficulty by providing a combination antenna for both infrared and radar energy, with a reduction in the weight, size, and installation problems. In the instant apparatus, a reflector device for infrared radiant energy is mounted behind the radar antenna reflector which is preferably fabricated of an open mesh material and fastened in front of the infrared reflector. In the embodiment of the invention shown the radar feed and a secondary mirror for infrared energy are mounted in front of the radar reflector. An infrared detector cell may be suitably positioned, for example, behind an aperture located at a predetermined position in the reflector of infrared energy. The size of the mesh of the radar reflector is so chosen that the dimensions of the openings are small compared to the wavelenght of the radio frequency to be received or transmitted so that with respect to the radar energy the mesh has the reflective powers of substantially a solid surface. At infrared frequencies the mesh represents a substantially open area when compared to the wavelength of the infrared energy. The mesh therefore serves as the radar reflector but is essentially transparent to the infrared energy.

Accordingly, a primary object of the invention is to provide new and improved radiant energy receiving and transmitting antenna means for simultaneously responding to energy of radio frequency and infrared energy.

Another object is to provide new and improved combination antenna means for infrared reception and radar transmission and reception.

Other objects and advantages will become apparent after a perusal of the following specification when read in connection with the accompanying drawing, in which the single figure thereof is a view partially schematic and partially in cross section of apparatus according to the preferred embodiment of the invention.

Particular reference should be made now to the drawing for a more complete understanding of the invention wherein the reference numeral 10 designates an infrared detector cell responsive to infrared energy and which may be of any convenient design. Disposed adjacent or near the cell 10 is a reflector support 11 which may be composed of glass or other suitable material, and which may have an aperture 12 which may be centrally disposed thereof. The reflecting surface 13 of the support 11 is responsive to infrared energy, may be composed of a suitable metal such as aluminum or silver, and has a curvature which is preselected in accordance with the location and shape of a secondary infrared mirror reflector 9 which may also be composed of silver or aluminum and which is supported by support 14 which may be composed of glass or other suitable material, and also in accordance with the desired field of response of the infrared antenna. The secondary mirror support 14 may conveniently be mounted upon a radar feed 15 which, it is understood, is mounted by means, not shown, in predetermined position with respect to the infrared reflector support 11 and a radar reflector 16 which is disposed in front of the reflecting surface 13 at a predetermined distance therefrom.

The radar reflector 16 is preferably composed of a mesh of highly conductive material, and the size of the mesh is so chosen that the mesh openings are of small dimensions compared to the wavelength of the radar frequency. As a result, the wire mesh 16 will look almost the same as a solid surface to the radar energy even though the mesh may be 80% to 90% open area. The radar energy, either transmitted or received, may be expected to follow the path 17. Transmitted energy leaving the end of the radar feed 15 is reflected from reflector 16 in a preselected direction to provide a desired radiation pattern which may be a search pattern, a track with conical scan pattern, or other desired pattern, the shape of reflector 16 and location of the focal point of the radar feed 15 being chosen in accordance with the desired pattern of radar radiation or reception, it being understood that the shape shown in the figure is illustrative only.

Received infrared energy follows the path 18 being reflected from the curved reflecting surface 13 to the aforementioned secondary mirror 9 and thence through aperture 12 to the infrared detector cell 10.

In the embodiment shown in the figure, the mesh 16 also serves to protect the infrared detector cell 10 from high power radiation from the radar feed horn or feed means 15 during transmission.

The term "feed means" as used herein includes means for conducting energy of radio frequency from or to the remainder of the antenna apparatus, depending upon whether the energy is received energy or energy to be transmitted.

Any suitable means, not shown, may be employed for mounting the various elements hereinbefore described in the desired positions with respect to each other. For example, the radar reflector 16 may be mounted upon infrared reflector support 11.

Whereas the invention has been shown and described in connection with radar apparatus, its use is not limited thereto, but use of the antenna apparatus of the instant invention is contemplated wherever suitable for simultaneous radio frequency and infrared frequency transmission or reception.

Any suitable materials may be employed for the infrared reflectors or mirrors 13 and 9, and for their respective supports 11 and 14.

It should be understood that the infrared detector cell 10 may be replaced by a source of infrared energy if desired.

Whereas the invention has been shown and described with reference to an embodiment thereof which gives satisfactory results, it should be understood that the embodiment shown is illustrative only and that changes may be made and equivalents substituted without departing from the spirit and scope of the invention.

We claim as our invention:

1. Antenna apparatus for simultaneously receiving from substantially the same direction radiant energy of radio frequency and radiant energy of infrared frequency, comprising, in combination, first infrared reflector means, said first infrared reflector means having an aperture therein, an infrared detector cell disposed in predetermined position with respect to said aperture and responsive to infrared energy passing through said aperture, second infrared reflector means disposed in predetermined position with respect to said first infrared reflector means, said first and second infrared reflector means focussing infrared energy arriving from said direction through said aperture onto said infrared detector cell, other reflector means disposed between said first and second infrared reflector means, said other reflector means being constructed and arranged to reflect energy of radio frequency, said other reflector means being further constructed and arranged to pass without reflection energy of infrared frequency, and radio frequency feed means disposed in predetermined position with respect to said other reflector means, said other reflector means having a preselected shape to reflect radio frequency energy arriving from said direction to said feed means.

2. A combined radar and infrared antenna apparatus comprising, in combination, a radar feed member, an infrared-energy-transparent radar reflector for said radar feed member, a primary infrared reflector behind said radar reflector, said primary infrared reflector having an aperture therein, an infrared detector in registry with said aperture, and a secondary infrared reflector in front of said radar reflector for directing infrared energy reflected from said primary reflector through said aperture to said infrared detector.

3. A combined radar and infrared antenna apparatus comprising, in combination, a radar feed member, an infrared-energy-transparent radar reflector for said radar feed member, a primary infrared reflector of curvature different than that of said radar reflector and disposed behind said radar reflector, said primary infrared reflector having an aperture therein, an infrared detector in registry with said aperture, and a secondary infrared reflector in encirclement of said radar feed member in front of said radar reflector for directing infrared energy reflected from said primary reflector through said apeture to said infrared detector.

4. A combined radar and infrared antenna apparatus comprising, in combination, a thin curved infrared-energy-transparent radar reflector for directing and defining a radar beam, a radar feed member directed toward and at the center of focus of the concave face of said radar reflector, a concave infrared reflector disposed behind and facing said radar reflector, said concave infrared reflector having a central aperture therein, an infrared detector registering with said aperture, and an annular convex infrared reflector encircling said radar feed member and facing said radar reflector for directing infrared energy reflected from said concave infrared reflector through said aperture to said infrared detector.

References Cited in the file of this patent

UNITED STATES PATENTS

| | | |
|---|---|---|
| 2,636,125 | Southworth | Apr. 21, 1953 |
| 2,648,779 | Kohl | Aug. 11, 1953 |
| 2,870,444 | Broussaud | Jan. 20, 1959 |

FOREIGN PATENTS

| | | |
|---|---|---|
| 1,114,607 | France | Dec. 19, 1955 |